United States Patent [19]

Byrne

[11] Patent Number: 4,993,576

[45] Date of Patent: Feb. 19, 1991

[54] MOUNTING ASSEMBLY

[76] Inventor: Norman R. Byrne, 2736 Honey Creek, N.E., Ada, Mich. 49301

[21] Appl. No.: 517,372

[22] Filed: May 1, 1990

[51] Int. Cl.[5] .................... H02G 3/08

[52] U.S. Cl. .................... 220/3.9; 174/58; 248/221.4

[58] Field of Search .................... 220/3.2, 3.3, 3.5, 3.6, 220/3.9; 248/221.4, 222.1, 223.4; 174/58

[56] References Cited

U.S. PATENT DOCUMENTS

| | | | |
|---|---|---|---|
| 2,023,083 | 12/1935 | Knell | 220/3.9 |
| 3,573,716 | 4/1971 | Garver . | |
| 3,617,989 | 11/1971 | Heath . | |
| 3,812,450 | 5/1974 | Simovits, Jr. et al. . | |
| 3,970,276 | 7/1976 | Debaight . | |
| 3,989,343 | 11/1976 | Lucius et al. . | |
| 4,062,470 | 12/1977 | Boteler | 220/3.9 X |
| 4,214,668 | 7/1980 | Neff et al. | 220/3.9 X |
| 4,500,746 | 2/1985 | Meehan | 174/58 X |
| 4,541,036 | 9/1985 | Landries et al. . | |
| 4,612,603 | 9/1986 | Cook | 220/3.9 X |
| 4,747,506 | 5/1988 | Stuchlik, III | 220/3.9 |
| 4,775,328 | 10/1988 | McCarthy | 439/211 |

FOREIGN PATENT DOCUMENTS 2316582 10/1973 Fed. Rep. of Germany .

OTHER PUBLICATIONS

AMP Incorporated Brochure entitled AMP* Products for the Office of the 80's . . . and Beyond.

Electri-Cable Assemblies, Inc. brochure entitled Electri-Pak 7 TM.

*Primary Examiner*—Steven M. Pollard
*Attorney, Agent, or Firm*—Varnum, Riddering, Schmidt & Howlett

[57] ABSTRACT

An electrical junction block housing is mounted on a structural member in a raceway by means of spaced-apart L-shaped mounting brackets and a retaining tab integral to a support plate. The housing is provided with L-shaped attachment lugs for slidably engaging the support brackets. A latching device engaging the retaining tab is used to maintain the housing in position relative to the support bracket. The latching device includes a pair of opposing interlocking members hingedly attached to the housing allowing the housing to be inserted and removed from either side of the structural member. The opposing interlocking members, which define a channel between them for engaging the retaining tab, include a cooperating tongue on one of the interlocking members and groove on the other of the interlocking members. A force exerted on either of the interlocking members in the direction of the housing causes both interlocking members to move in the direction of the housing, thereby disengaging both members from the retaining tab and allowing the junction block housing to be removed in the direction of the interlocking member on which the force was exerted. The interlocking members are made of a resilient plastic material, providing a returning force on the hinged members in the direction of the retaining tab.

15 Claims, 2 Drawing Sheets

MOUNTING ASSEMBLY

BACKGROUND OF THE INVENTION

1. Field of the Invention

The invention relates to apparatus for mounting electrical junction blocks and the like, and, more particularly, to means for mounting such devices in confined areas such as electrical raceways.

2. Description of Related Art

Modern office arrangements often employ removable wall panels or the like to define work areas. Such panels and other structures often have a raceway area for accommodating electrical wiring and electrical junction blocks near the floor or in other locations which do not provide for easy access by technicians. Typically, junction blocks are mounted within raceway areas by attaching them to support brackets, provided in the raceway for that purpose, by means of screws or bolts engaging lugs on the junction blocks.

Since the electrical wiring requirements and locations of the junction blocks, which may include electrical outlet boxes and the like, depend on the ever-changing needs of the users, junction blocks are often installed or moved after the wall panels or like structures are in place. Installing or removing a junction block mounted by means of screws or bolts in a raceway position, for example, near the bottom of a wall panel and essentially at floor level, is often an arduous task. It usually requires that a technician be in a position close to the floor to get a clear view of the screws or bolts and to be able to correctly engage them with a tool. Another difficulty with prior art arrangements is that such screw or bolt fasteners typically can be removed from only one side of the wall structure. Thus, a technician may be required to move into another room or other work area to gain access to the fasteners.

SUMMARY OF THE INVENTION

These and other problems of the prior art are overcome in accordance with the present invention by providing a device such as a junction block or the like with a pair of spaced-apart attachment lugs for sliding engagement with a corresponding pair of support brackets disposed within a raceway or the like, and with a latch comprising a pair of interlocking members for engagement with the raceway to maintain the device in position on the support brackets.

A device provided with a rail engagement member in accordance with this invention may be mounted in the raceway by sliding the engagement lugs on the device into engagement with the corresponding support brackets from either side of the raceway until the latch on the device is in engagement with the raceway. The device may be conveniently removed from either side of the raceway by operating one of the interlocking latch members and sliding the device off the support brackets.

Advantageously, the mounting assembly of this invention allows for installation and removal of junction blocks or the like without the use of tools and without the necessity of obtaining a clear view of the device to be installed or removed.

In one specific embodiment of the invention, the latching device comprises two opposing interlocking members hingedly attached to the device housing. The two interlocking members are arranged to define a channel between opposing edges thereof for engaging a retaining tab integral to the raceway. Advantageously, the hinged members may be made from a hard plastic or the like having a resilient property such that interlocking members may be forced into close proximity of the housing for insertion and removal, and to engage the retaining tab when released.

In one specific embodiment of the invention, one of the interlocking members of the latching device comprises an elongated extension member extending in the direction of the other interlocking member, and the other interlocking member comprises a groove for receiving the extension member. Accordingly, the exertion of a force on one of the opposing interlocking members causes both interlocking members to be depressed, thereby allowing removal of the device from either side of the raceway.

In one specific embodiment of the invention, the attachment lugs are substantially L-shaped lugs and the support brackets are constructed of a single bracket assembly consisting of a top plate and L-shaped side members for forming L-shaped support brackets. A portion of the top blade is cut to form the retaining tab and is bent downward in the direction of a mounted housing to be positioned for engagement with the latching device.

BRIEF DESCRIPTION OF THE DRAWING

The invention will now be described with reference to the drawing, in which.

DESCRIPTION OF THE PREFERRED EMBODIMENT

Figure 1:
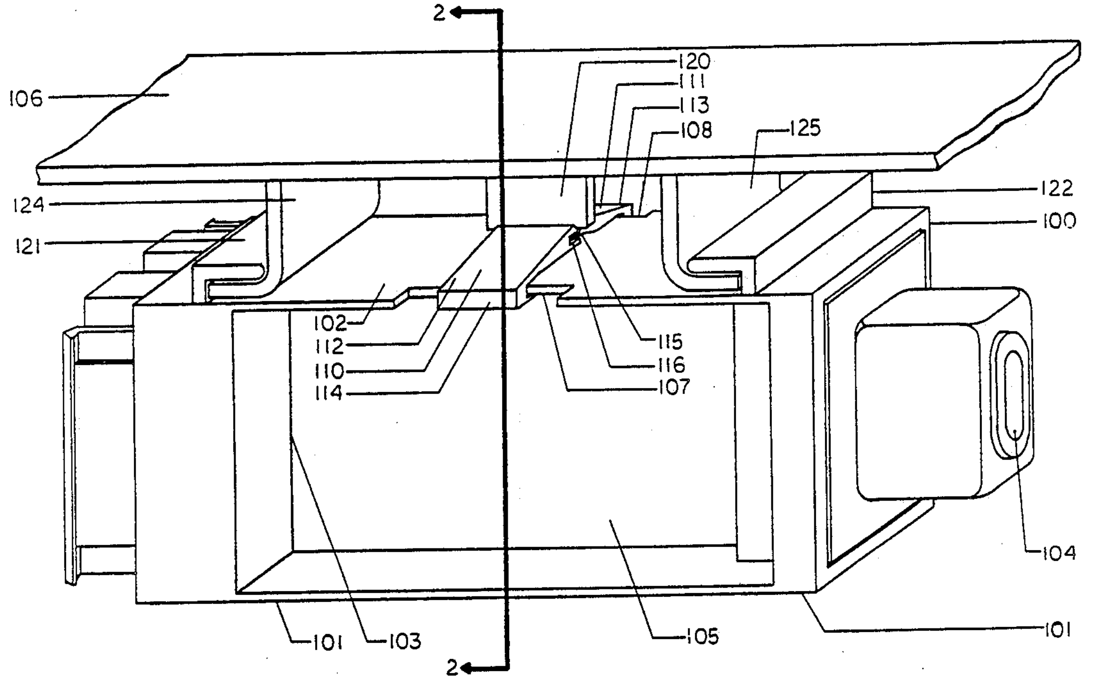
FIG. 1 is a perspective view of an illustrative embodiment of a junction block housing and mounting assembly in accordance with the invention.

FIG. 1 is an illustrative embodiment of the invention in which an electrical junction block housing 100 is attached to a structural member 106 by means of L-shaped mounting lugs 121, 122 engaging corresponding L-shaped support brackets 124, 125. Structural member 106 may, for example, be the upper wall of a raceway in a wall panel or the like. Housing 100 includes lower wall 101, upper wall 102 and middle wall 103 which serve to divide a spatial area 105 for a similar area on the opposite side of wall 103. The spatial areas may be used to accommodate electrical outlet boxes or the like. An opening 104 may be used for connection to an electrical conduit or the like.

The housing 100 is maintained in position relative to the support brackets 124, 125 by engagement of retaining tab 120 on structural member 106 with latching device 110 disposed between mounting lugs 121, 122 on upper wall 102. The latching device includes interlocking latch members 111, 112. Member 111 is provided with an elongated member such as tongue 115, and interlocking member 112 is provided with an appropriate opening such as groove 116 to receive the tongue 115. The interlocking latch members are hinged at hinge points 113, 114 and are constructed of a resilient plastic material such as a polycarbonate which provides a restoring force on the interlocking latch members 111, 112. A channel 117 is defined by the interlocking members for engaging the retaining tab 120. The latching device 110 may be disengaged from the retaining tab 120 by depressing either of the interlocking latch members 111, 112, which causes both of the interlocking latch members to be depressed and causes tab 120 to be disengaged from channel 117. The junction block 100 may be removed from the support brackets 124, 125 by depressing one of the interlocking latch members 111, 112 and sliding the housing on support brackets 124, 125 in either direction. Similarly, the housing 110 may be installed from either side of structural member 106 by slidingly engaging attachment lugs 121, 122 with the support brackets 124, 125. The sliding motion on support brackets 124, 125 will result in engagement of latch 110 with the tab 120, causing both latch members 111, 112 to be depressed until the tab 120 is aligned with the channel 117. At that point, the restoring force imparted to the latch 110 due to the resiliency of the interlocking members 111, 112, causes engagement of the channel 117 with the retaining tab 120, thereby placing the housing 100 in a locked position.

Figure 2:
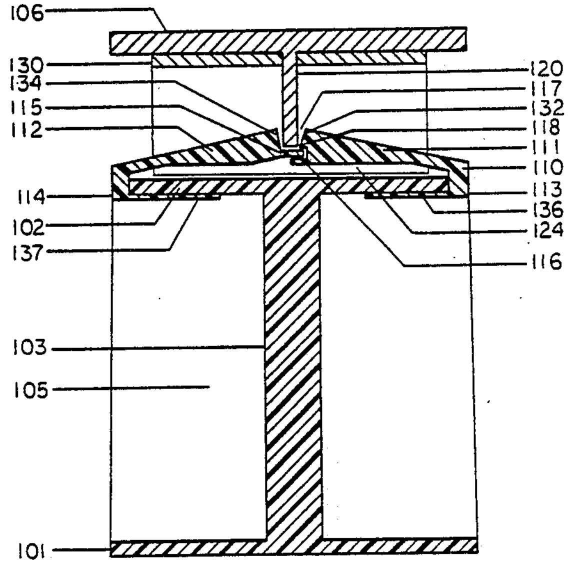
FIG. 2 is a cross-sectional view along line 2—2 of FIG. 1.

FIG. 2 is a cross-sectional view along line 2—2 of FIG. 1, showing middle wall 103 and greater detail of the latching device 110. Channel 117 is shown to be defined by opposing edges 132, 134 of the interlocking latch members 111, 112, respectively. A lower surface of the channel 117 is defined by tongue 115 of member 112. The tongue 115 engages groove 116 of member 111. The cooperation of tongue and groove 115, 116 causes latching device 110 to disengage from retaining tab 120 when either of the interlocking latch members 111, 112 is depressed and forced toward upper wall 102. As can be seen from the drawing, when latch member 111 is depressed, upper edge 118 of latch member 111 exerts pressure on tongue 115 of latch member 12. This causes both members 111 and 112 to be depressed, releasing engagement with tab 120 and allowing housing 100 to be slidably removed from either side of structural member 106. The same result is obtained when tongue 115 of latch member 112 is forced against the lower edge of groove 116.

Figure 4:
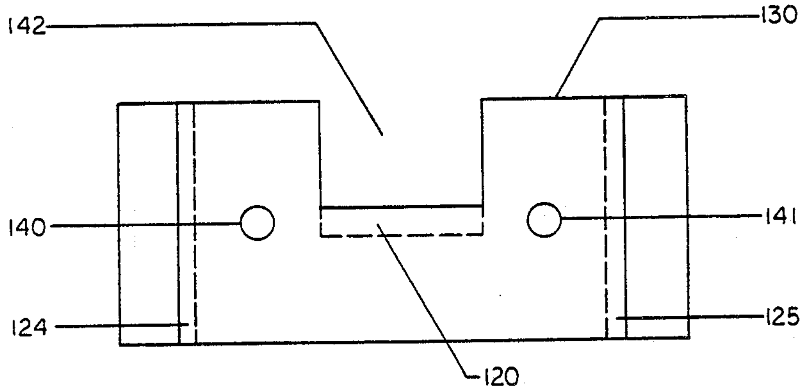
FIG. 4 is a top elevation of the mounting bracket of FIG. 3.
Figure 5:
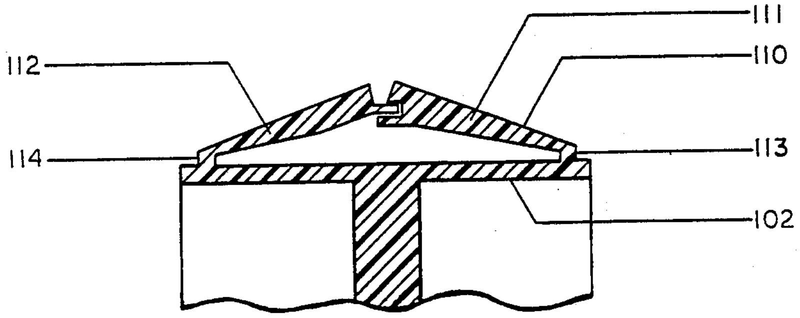
FIG. 5 is a fragmentary cross section elevational view of a latching device formed integral with an electrical junction block.

The latching device 110 is attached to upper wall 102 by means of attachment members 136, 137 which, in this illustrative embodiment, are attached by a suitable adhesive to the underside of wall 102. The attachment members 136, 137 are attached to the corresponding interlocking latch members 111, 112, which extend at acute angles to attachment members 136, 137, respectively, via vertically extending hinge sections 113, 114. Hinge sections 113, 114 are disposed within indents 107, 108, as shown in FIG. 1. Alternatively, the interlocking members 111, 112 may be formed integral with upper wall 104 or attached to the top surface of upper wall 104 in a suitable manner. FIG. 5 is a fragmentary cross section elevational view of the latching device 110 formed as an integral part of upper wall 102 of housing 100. Vertical hinge sections 113, 114, like latch members 111, 112, are made of a resilient plastic material to provide a restoring spring force to latch members 111, 112 when the same are depressed and forced toward upper wall 102. FIG. 2 shows a portion of support plate 130, fastened to the structural member 106 by mounting screws or rivets (not shown in the drawing) in a standard manner. Retaining tab 120 and support brackets 124, 125 are formed as integral parts of support plate 130, as described further with respect to FIGS. 3 and 4.

Figure 3:
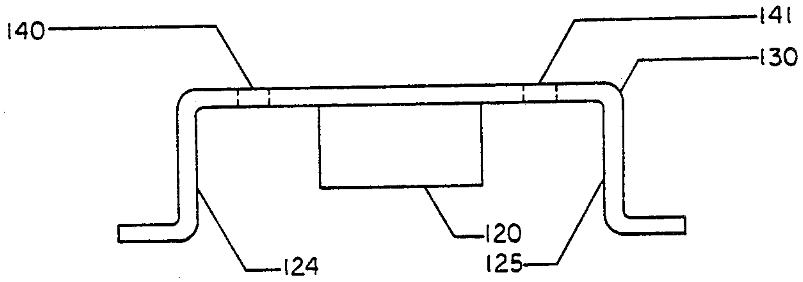
FIG. 3 is a side elevation of an illustrative mounting bracket for use in the arrangement of FIG. 1.

FIG. 3 is a side elevation of support plate 130 showing the L-shaped brackets 124, 125 and retaining tab 120. Holes 140, 141 are provided for attachment of the support bracket 130 to the structural member 106 in a standard fashion. In this illustrative embodiment of the invention, the support brackets 124, 125 are formed by bending of the support plate 130, and the retaining tab 120 is formed by cutting the support plate to define a rectangular section and bending the section in the downward direction, substantially at a right angle to the plate 130. FIG. 4 represents a top elevation of the support plate 30 of FIG. 3 showing a top edge of retaining tab 120 as well as brackets 124, 125 and mounting holes 140, 141. An opening, created in support bracket 130 by cutting and bending down a rectangular section defining retaining tab 120, is shown at 142.

It will be understood that the embodiments disclosed herein are only illustrative of the invention and numerous other arrangements may be derived by those skilled in the art without departing from the spirit and scope of the invention.

The embodiments of the invention in which an exclusive property or privilege is claimed are defined as follows:

1. A mounting arrangement for mounting a housing having an outer wall on a structural support member, said arrangement comprising:

- first and second spaced-apart support brackets on said structural support member;
- first and second spaced-apart attachment lugs on said outer wall of said housing for slidably engaging said first and said second support brackets, respectively;
- retaining means on said supporting member;
- latch means comprising a pair of opposing interlocking movable latch members hingedly attached to said outer wall of said housing and defining therebetween a channel for engaging said retaining means; and
- each of said interlocking latch members is operable to disengage both of said latch members from said retaining means in response to an external force on either of said latch members, whereby said retaining means is disengaged from said latch means by operation of either of said latch members to allow sliding movement of said housing in opposite directions on said support brackets.

2. The arrangement in accordance with claim 1 wherein said channel defined by said interlocking members extends in a direction parallel to a longitudinal axis of said housing and transverse to the direction of sliding engagement of said attachment lugs with said support brackets and wherein one of said interlocking members comprises an extension member extending across said channel for engagement with the other of said interlocking members, whereby movement of one of said interlocking members toward said outer wall causes movement of both of said interlocking members toward said outer wall and disengagement of both of said interlocking members from said retaining means.

3. The arrangement in accordance with claim 2 wherein said housing comprises an electrical junction block for interconnecting electrical wiring and supporting an electrical outlet.

4. The arrangement in accordance with claim 3 wherein said junction block is mounted within a raceway of a wall panel.

5. The arrangement in accordance with claim 1 wherein said latch members each comprise an attachment member attached to said outer wall and an angular member extending at an acute angle relative to said attachment member and hingedly attached to said attachment member.

6. The arrangement in accordance with claim 5 wherein said outer wall comprises an exterior and interior surface, wherein said angular members are disposed above the exterior surface, and wherein said attachment members are attached to said interior surface.

7. The arrangement in accordance with claim 6 wherein said outer wall is provided with first and second detents and wherein said angular members are attached to corresponding attachment members by means of an interconnecting sections disposed within said detents.

8. The arrangement in accordance with claim 1, further comprising a support plate attached to said structural member and wherein said support brackets and said retaining means form an integral part of said support plate.

9. An electrical junction block housing adapted for attachment to a support structure, comprising an outer wall and a pair of spaced-apart, substantially L-shaped attachment lugs extending outwardly from said outer wall for slidably engaging corresponding support brackets;

latch means disposed between said attachment lugs and comprising a pair of opposing interlocking movable latch members defining therebetween a channel for engagement with a retaining member, said latch members hingedly attached to said outer wall and movable with respect to said outer wall, wherein movement of one of said latch members toward said outer wall causes movement of both of said latch members toward said outer wall for disengaging said defined channel from a retaining member.

10. The housing in accordance with claim 9 wherein one of said latch members comprises an elongated member extending across said channel and the other of said latch members comprises an opening for engaging said extension member, wherein said extension member and said opening cooperate to cause movement of both of said latch members in the direction of said housing when one of said interlocking members is moved in the direction of said housing.

11. The housing in accordance with claim 10 and further comprising a pair of attachment members hingedly connected to corresponding ones of said latch members and attached to said outer wall.

12. The arrangement in accordance with claim 11 wherein said outer wall comprises exterior and interior surfaces, wherein said latch members are disposed outside said exterior surface and said attachment members are attached to said interior surface and hingedly attached to said interlocking members by means of interconnection sections and wherein said wall is provided with a pair of detents and said interconnecting sections are disposed within said detents.

13. The housing in accordance with claim 9 wherein said latch members are constructed of a material having resilient properties providing a restoring force to said latch members away from said outer wall.

14. The housing in accordance with claim 9 wherein said outer wall comprises opposite exterior edges extending in a direction substantially parallel to said channel and one of said latch members is attached to said outer wall near each of said edges.

15. The housing in accordance with claim 9 wherein said interlocking latch members are formed integral with said outer wall.

* * * * *